Aug. 26, 1952     L. W. WIGHTMAN ET AL     2,608,677
DYNAMOELECTRIC MACHINE VENTILATION
Filed Oct. 20, 1950
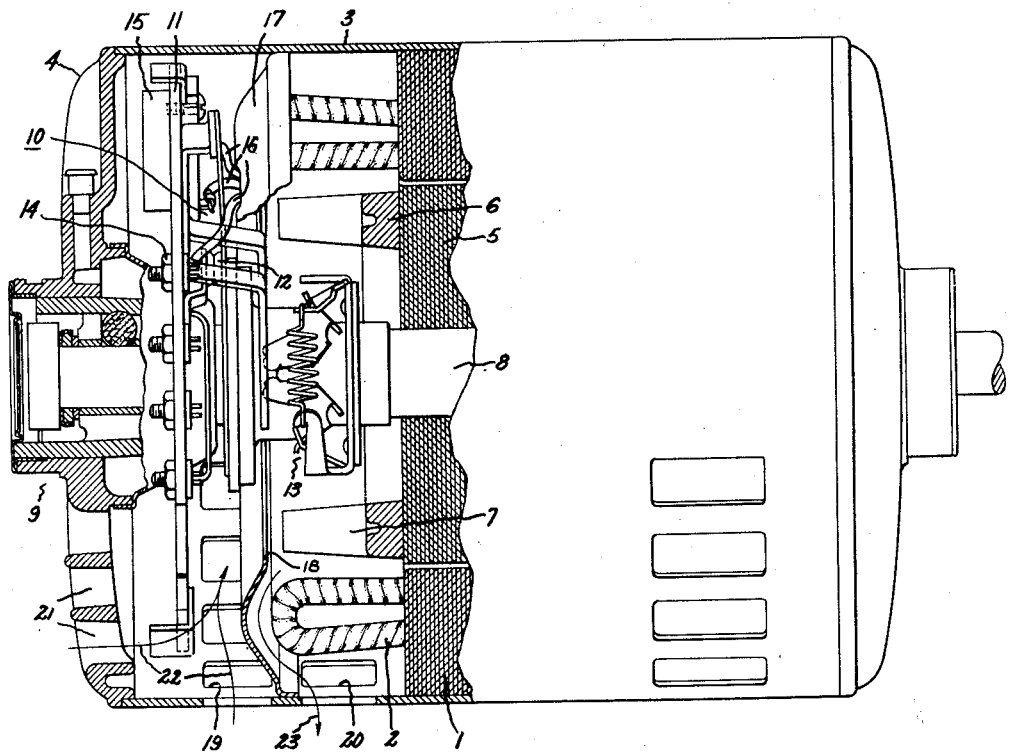
Inventors:
Lawrance W. Wightman,
Glenn D. Willits,
by Ernest C. Britton
Their Attorney.

Patented Aug. 26, 1952

2,608,677

UNITED STATES PATENT OFFICE 2,608,677

DYNAMOELECTRIC MACHINE VENTILATION

Lawrence W. Wightman, Fort Wayne, and Glenn D. Willits, Leo, Ind., assignors to General Electric Company, a corporation of New York Application October 20, 1950, Serial No. 191,248

5 Claims. (Cl. 318—221)

This invention relates to dynamoelectric machine ventilation and more particularly to ventilating arrangements for single phase alternating current motors.

The ventilation of single phase alternating current motors particularly in the fractional horsepower frame sizes, is complicated by the fact that one end of the machine is provided with a centrifugal mechanism, a starting switch and a terminal board. Cross connections are necessary from the end turns of the windings to the starting switch and terminal board making the provision of a complete baffle difficult and furthermore, the presence of the centrifugal mechanism, starting switch and terminal board restricts the area available for air inlet and outlet. It is therefore desirable in the design of such motors to provide a ventilating arrangement for the switch end which will furnish adequate cooling without interfering with the starting components.

An object of this invention is to provide an improved ventilating arrangement for a dynamoelectric machine.

Another object of this invention is to provide an improved ventilating arrangement for a single phase alternating current motor.

A further object of this invention is to provide an improved ventilating arrangement for the switch end of a single phase alternating current motor.

Further objects and advantages of this invention will become apparent and the invention will be better understood by reference to the following description and the accompanying drawing, and the features of novelty which characterize this invention will be pointed out with particularity in the claims annexed to and forming a part of this specification.

In accordance with this invention, a single phase alternating current motor is provided having a cylindrical shell member in which a stator member is arranged. A rotor member mounted on a shaft is positioned within the stator, the shaft being journaled in a bearing, mounted in an end flange. An annular baffle member is mounted in the shell member intermediate the stator member and the flange and defines a central opening. A starting switch is mounted in the shell member intermediate the baffle and the flange and a centrifugal mechanism for actuating the switch is mounted on the rotor shaft. A plurality of circumferentially spaced openings are formed in the shell member intermediate the end flange and the baffle and a plurality of other circumferentially spaced openings are also formed in the shell intermediate the baffle and the stator member. Air inlet openings may also be formed in the end flange. A fan is provided on the shaft or the rotor for drawing ventilating air into the shell through the end flange openings and the shell openings intermediate the baffle and the end flange and for discharging the air through the shell openings intermediate the baffle and the stator.

The drawing is a side elevation view, partly in section, illustrating the improved ventilating arrangement of this invention.

Referring now to the drawing, there is shown a single phase alternating current motor of the split phase type having a stator member 1 provided with suitable winding slots (not shown) in which suitable field windings 2 are arranged. The stator member 1 is mounted in a cylindrical shell member 3 in any suitable manner and an end flange member 4 closes the shell member. A rotor member 5 is arranged within the stator member 1 and is provided with suitable squirrel cage conductors (not shown) connected by end rings 6. A plurality of fan blades 7 are cast integral with the end ring 6, however it will be readily understood that a separate fan may be utilized. The rotor 5 is mounted on a shaft 8 which is journaled in bearing 9 formed in the end shield 4.

In order to provide a rotating magnetic field for starting a single phase alternating current motor, it is customary to provide two sets of windings, commonly designated as running and starting windings, which are physically and electrically displaced. After the motor has come up to a predetermined speed, the starting winding is removed from the circuit and the motor runs on the running winding alone. In order to accomplish the disconnection of the starting winding, a starting switch and terminal board assembly 10 is mounted in the shell member 3 in any suitable manner. The starting switch and terminal board assembly 10 comprises a terminal board 11, formed of any suitable insulating material and a switch portion 12, mounted thereon. The details of the starting switch and terminal board assembly 10 shown here are more fully described in copending application Serial No. 170,635 filed June 27, 1950 of Glenn D. Willits, assigned to the assignee of the present application. It will however be readily understood that any other switch and terminal board assembly can be utilized in this construction. The switch 12 is arranged for actuation by centrifugal mechanism 13 mounted on the shaft 8. The terminals 14 of the terminal board 11 are accessible to the exterior of machine through an opening in the end flange 4 (not shown) and an overload protective device 15 may also be mounted on the terminal board 11. The starting switch 12, terminals 14, overload protective device 15, and the end turns 2 are suitably connected by leads 16.

It will now be readily seen that the switch end of the motor described above is cluttered with the centrifugal mechanism 13, and the switch and terminal board assembly 10. Leads 16 must connect the terminal board and switch assembly 10 to the end turns 2 making the provision of a complete baffle difficult and the built-in terminal board 11 restricts the possibility of adequate air inlets on the end flange 4. In order to provide for the ventilating of the switch end of this motor, the arrangement now to be described is to be provided. An annular baffle member 17 is mounted within the shell member 3 intermediate the end flange 4 and the stator member 1. The baffle surrounds the end turns 2 and defines a central opening 18 through which the centrifugal mechanism 13 extends. A plurality of circumferentially arranged openings 19 are formed in the shell 3 intermediate the end flange 4 and the baffle member 17 and another plurality of circumferentially arranged openings 20 are also arranged in the shell 3 intermediate the baffle member 17 and the stator member 1. Openings 21 may also be formed in the end flange 4. In operation the fan 7 draws air through the openings 21 and the circumferentially spaced shell openings 19 into the shell, as shown by the arrows 22. This air, under the influence of the fan 7, is drawn around the baffle member 17 and is discharged through the shell openings 20, as shown by the arrows 23. The shell openings 19 and 20 may completely encircle the shell member 3, or may be merely arranged in the lower half thereof, as shown in the drawing, in order to provide a drip-proof construction.

It will now be readily apparent that the mounting of the switch and terminal board assembly 10 in the shell rather than in the conventional deep flange which ordinarily must cover the terminal board and switch assembly, permits the use of a substantially flat end flange 4, as shown in the drawing. With the usual deep flange, there is no room left for the air inlet openings in the circumferential portion of the motor shell. However, with the switch and terminal board assembly mounted in the shell, the cylindrical portion of the shell can be extended and the end flange made flat which provides circumferential space for the openings 19 and 20.

It will now be readily apparent that this invention provides an improved ventilating arrangement for the switch end of a single phase alternating current motor in which a complete baffle is provided for the fan and adequate air inlet and discharge openings are also provided.

While we have illustrated and described a specific embodiment of this invention, further modifications and improvements will occur to those skilled in the art. We desire it to be understood therefore that this invention is not limited to the embodiment shown and we intend in the appended claims to cover all modifications which do not depart from the spirit and scope of this invention.

What we claim as new and desire to secure by Letters Patent of the United States is:

1. In a single phase alternating current motor, a cylindrical shell member, a stator member arranged in said shell member and having field windings arranged therein with end turns extending therefrom, said shell member extending substantially beyond said end turns, a rotor member mounted on a shaft, an annular baffle member mounted in said shell member spaced from said stator member and defining a central opening, said baffle member being adjacent said end turns, a starting switch mounted in said shell member on the side of said baffle member remote from said stator for disconnecting a part of said field windings when said motor has reached a predetermined speed, a centrifugal mechanism mounted on said shaft and extending through said central opening in said baffle for actuating said starting switch, said shell member having a plurality of circumferentially spaced openings formed therein on the side of said baffle member remote from said stator member and a plurality of other circumferentially spaced openings formed therein intermediate said stator member and said baffle member and over said end turns, and fan means in said shell member for drawing ventilating air into said shell through said first mentioned openings and for discharging air through said other openings.

2. In a single phase alternating current motor, a cylindrical shell member, a stator member arranged in said shell member and having field windings arranged therein with end turns extending therefrom, said shell member extending substantially beyond said end turns, a rotor member mounted on a shaft, an annular baffle member mounted in said shell member spaced from said stator member and defining a central opening, said baffle member being adjacent said end turns, a starting switch mounted in said shell member on the side of said baffle member remote from said stator for disconnecting a part of said field windings when said motor has reached a predetermined speed, a centrifugal mechanism mounted on said shaft and extending through said central opening in said baffle for actuating said starting switch, said shell member having a plurality of circumferentially spaced openings formed therein intermediate said baffle member and said starting switch and a plurality of other circumferentially openings formed therein intermediate said stator member and said baffle member and over said end turns, and fan means in said shell member for drawing ventilating air into said shell member through said first mentioned openings and for discharging air through said other openings.

3. In a single phase alternating current motor, a cylindrical shell member, a stator member arranged in said shell member and having field windings arranged therein with end turns extending therefrom, said shell member extending substantially beyond said end turns, a rotor member mounted on a shaft, an end flange member for closing said shell member and having a bearing mounted therein for rotatably supporting said shaft, an annular baffle member mounted in said shell member intermediate said stator member and said end flange member and defining a central opening, said baffle member being adjacent said end turns, a starting switch mounted in said shell member intermediate said baffle member and said end flange member for disconnecting a part of said windings when said motor has reached a predetermined speed, a centrifugal mechanism mounted on said shaft and extending through said central opening in said baffle for actuating said starting switch, said shell member having a plurality of circumferentially spaced openings formed therein intermediate said end flange member and said baffle member and a plurality of other circumferentially spaced openings formed therein intermediate said stator member and said baffle member and over said end turns, said end flange member having an air inlet opening formed therein, and fan means in said shell member for drawing ventilating air into said shell member through said end flange opening and said first mentioned shell openings and for discharging said air through said other shell openings.

4. In a single phase alternating current motor, a cylindrical shell member, a stator member arranged in said shell member and having field windings arranged therein with end turns extending therefrom, said shell member extending substantially beyond said end turns, a rotor member mounted on a shaft, an end flange member for closing said shell member and having a bearing mounted therein for rotatably supporting said shaft, an annular baffle member mounted in said shell member intermediate said stator member and said end shield member and defining a central opening, said baffle member being adjacent said end turns, a starting switch assembly mounted in said shell member intermediate said baffle member and said end flange member for disconnecting a part of said field windings when said motor has reached a predetermined speed, said starting switch assembly having a terminal board in said shell member for making external connections, said end flange having an opening therein providing access to said terminal board, a centrifugal mechanism mounted on said shaft and extending through said central opening for actuating said starting switch, said shell member having a plurality of circumferentially spaced openings spaced therein intermediate said end flange member and said baffle member and a plurality of other circumferentially spaced openings formed therein intermediate said stator member and said baffle member and over said end turns, and fan means in said shell member for drawing ventilating air into said shell member through said first mentioned shell openings and for discharging said air through said other shell openings.

5. In a single phase alternating current motor, a cylindrical shell member, a stator member arranged in said shell member and having field windings arranged therein with end turns extending therefrom, said shell member extending substantially beyond said end turns, a rotor member mounted on a shaft, a substantially flat end flange member for closing said shell member and having a bearing mounted therein for rotatably supporting said shaft, an annular baffle member mounted in said shell member intermediate said stator member and said end flange member and defining a central opening, said baffle member being adjacent said end turns, a starting switch mounted in said shell member intermediate said baffle member and said end flange member for disconnecting a part of said field windings when said motor has reached a predetermined speed, a centrifugal mechanism mounted on said shaft and extending through said central opening in said baffle for actuating said starting switch, said shell member having a plurality of circumferentially spaced openings formed therein intermediate said end flange member and said baffle member and a plurality of other circumferentially spaced openings formed therein intermediate said stator member and said baffle member and over said end turns, and fan means in said shell member for drawing ventilating air into said shell member through said first mentioned shell openings and for discharging said air through said other shell openings.

LAWRENCE W. WIGHTMAN.
GLENN D. WILLITS.

REFERENCES CITED

The following references are of record in the file of this patent:

UNITED STATES PATENTS

| Number | Name | Date |
|---|---|---|
| 2,050,180 | Hurxthal | Aug. 4, 1936 |
| 2,074,067 | Darnell | Mar. 16, 1937 |
| 2,099,050 | Chamberlain | Nov. 16, 1937 |
| 2,225,144 | Bassett | Dec. 17, 1940 |
| 2,277,425 | Wiest | Mar. 24, 1942 |
| 2,347,517 | Smalley | Apr. 25, 1944 |
| 2,457,994 | Formhals | Jan. 4, 1949 |

FOREIGN PATENTS

| Number | Country | Date |
|---|---|---|
| 395,758 | France | Jan. 6, 1909 |
| 716,297 | France | Dec. 17, 1931 |
| 502,059 | Germany | Mar. 26, 1931 |
| 589,762 | Germany | Dec. 13, 1933 |
| 596,056 | Germany | Apr. 25, 1934 |